(12) United States Patent
Tan et al.

(10) Patent No.: US 12,341,942 B2
(45) Date of Patent: Jun. 24, 2025

(54) STEREOSCOPIC IMAGE GENERATING DEVICE AND STEREOSCOPIC IMAGE GENERATING METHOD

(71) Applicant: Acer Incorporated, New Taipei (TW)

(72) Inventors: Chih-Haw Tan, New Taipei (TW); Wen-Cheng Hsu, New Taipei (TW); Shih-Hao Lin, New Taipei (TW); Sergio Cantero Clares, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 318 days.

(21) Appl. No.: 18/047,773

(22) Filed: Oct. 19, 2022

(65) Prior Publication Data

US 2023/0239449 A1    Jul. 27, 2023

(30) Foreign Application Priority Data

Jan. 24, 2022    (TW) .................................. 111102968

(51) Int. Cl.
*G06K 9/00*    (2022.01)
*G06F 3/14*    (2006.01)
(Continued)

(52) U.S. Cl.
CPC ............. *H04N 13/128* (2018.05); *G06F 3/14* (2013.01); *G06T 7/13* (2017.01); *G06T 7/50* (2017.01); *G06T 2207/10028* (2013.01)

(58) Field of Classification Search
CPC ........... H04N 13/128; G06T 7/13; G06T 7/50; G06T 2207/10028
See application file for complete search history.

(56) References Cited

U.S. PATENT DOCUMENTS 9,118,902 B1 *   8/2015   Conran ................ H04N 13/271
2013/0071009 A1 *   3/2013   Ha ............................ G06T 7/97
382/154

(Continued)

FOREIGN PATENT DOCUMENTS

CA         2848829 A1 *   8/2014   ............. G06T 5/003
CN     109003297 B       11/2020

(Continued)

OTHER PUBLICATIONS

A layered stereo matching algorithm using image segmentation and global visibility constraints, Michael Bleyer et al., ELSEVIER, 2005, pp. 128-150 (Year: 2005).*

(Continued)

*Primary Examiner* — Jayesh A Patel
(74) *Attorney, Agent, or Firm* — McClure, Qualey & Rodack, LLP (57) ABSTRACT

A stereoscopic image generating method is provided. The method includes: processing a first image to obtain depth data of each pixel in the first image, and generating a first depth-information map, wherein the first depth-information map includes depth information corresponding to each pixel; performing uniform processing on a plurality of edge pixels which are within a predetermined width from a plurality of edges of the first depth-information map, so that the processed edge pixels have the same depth information to establish a second depth-information map; setting a pixel offset corresponding to each pixel in the first image based on the depth information corresponding to each pixel of the second depth-information map; performing pixel offset processing on the first image to generate a second image; and outputting the first image and the second image to the display unit to display a stereoscopic image.

10 Claims, 4 Drawing Sheets

(51) Int. Cl.
*G06T 7/13* (2017.01)
*G06T 7/50* (2017.01)
*H04N 13/128* (2018.01)

(56) References Cited

U.S. PATENT DOCUMENTS

| | | | | |
|---|---|---|---|---|
| 2013/0106841 A1* | 5/2013 | Ko | ............... | H04N 13/128 |
| | | | | 345/419 |
| 2013/0106845 A1* | 5/2013 | Ko | ............... | H04N 13/128 |
| | | | | 382/154 |
| 2013/0114884 A1* | 5/2013 | Chen | ............... | H04N 13/128 |
| | | | | 382/154 |
| 2015/0215602 A1* | 7/2015 | Chang | ............... | H04N 13/128 |
| | | | | 348/51 |
| 2016/0191908 A1* | 6/2016 | Yen | ............... | H04N 13/261 |
| | | | | 348/54 |
| 2017/0064305 A1 | 3/2017 | Fu et al. | | |
| 2019/0208181 A1 | 7/2019 | Rowell et al. | | |
| 2019/0355141 A1* | 11/2019 | Chen | ............... | G06T 7/564 |
| 2020/0151894 A1 | 5/2020 | Jain et al. | | |

FOREIGN PATENT DOCUMENTS

| | | | | |
|---|---|---|---|---|
| EP | 263976 A * | 4/1988 | ............ | A61M 3/00 |
| EP | 2590418 A1 * | 5/2013 | ......... | H04N 13/0022 |
| EP | 2639761 A1 * | 9/2013 | ......... | G06K 9/00362 |
| EP | 2 658 265 B1 | 8/2014 | | |
| TW | 201320715 A * | 5/2013 | ......... | H04N 13/0022 |
| TW | M628629 U | 6/2022 | | |

OTHER PUBLICATIONS

Unsupervised deep learning for depth estimation with offset pixels, Saad Imran et al., Optics Express, Mar. 2020, pp. 8619-8639 (Year: 2020).*
Robust Semi-Automatic Depth Map Generation in Unconstrained Images and Video Sequences for 2D to Stereoscopic 3D Conversion, Raymond Phan et al., IEEE, 2014, pp. 122-136 (Year: 2014).*
Chinese language office action dated May 26, 2023, issued in application No. TW 111102968.
Extended European Search Report dated May 23, 2023, issued in application No. EP 22203802.8.
Chinese language office action dated Oct. 18, 2022, issued in application No. TW 111102968.

* cited by examiner

STEREOSCOPIC IMAGE GENERATING DEVICE AND STEREOSCOPIC IMAGE GENERATING METHOD

CROSS REFERENCE TO RELATED APPLICATIONS

This application claims priority from Taiwan Patent Application No. 111102968, filed on Jan. 24, 2022, the disclosure of which is incorporated herein in its entirety by reference.

BACKGROUND

Field of the Application

The present disclosure generally relates to an image processing device and an image processing method. More specifically, aspects of the present disclosure relate to a stereoscopic image generating device and a stereoscopic image generating method.

Description of the Related Art

There is a conventional method of generating stereoscopic images that uses monocular depth estimation technology.

Figure 1:
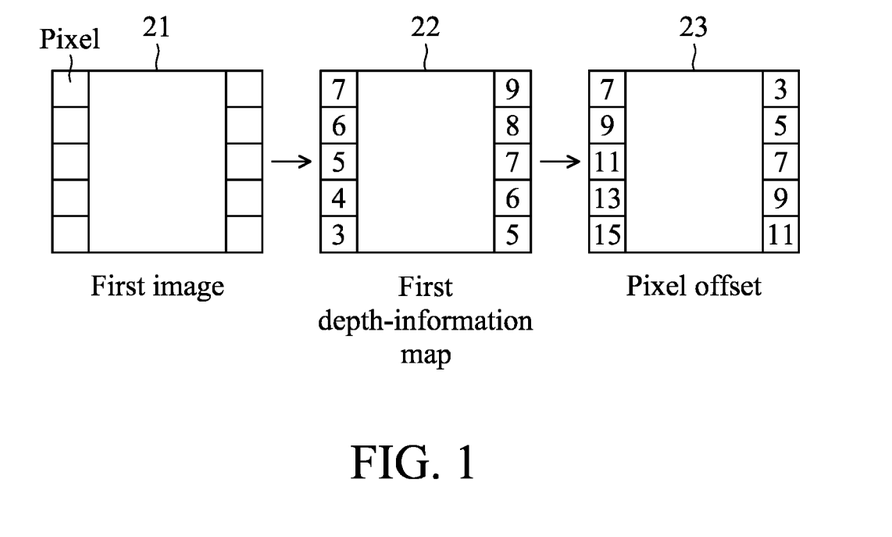
FIG. 1 illustrates a conventional stereoscopic image generating method.

FIG. 1 illustrates the conventional stereoscopic image generating method. First, the method uses a convolutional neural network model to estimate the depth information of each pixel in the first image 21 (that is, the first image 21 is used as the original image of the first viewing angle) to obtain the first depth-information map 22. Then, in this method, the pixel offset 23 of each pixel in the first image 21 is set according to the depth information corresponding to each pixel in the first depth-information map 22. Finally, the pixel offset 23 is used in the method to perform the pixel offset processing on the first image 21 to generate a second image (i.e., the second image is used as a reference image of the first viewing angle, not shown in FIG. 1). In addition, for the sake of simplicity, the first image 21, the first depth-information map 22, and the pixel offset 23 in FIG. 1 are taken as an example with an image width of 5 pixels. Furthermore, for the sake of brevity, FIG. 1 only shows the depth information and pixel offsets of 2 columns of pixels.

In the method, when the first image 21 is performed on pixel offset processing that is used to shift the pixels to the right, a plurality of edge pixels are generated in one or more columns of pixels on the left edge of the second image. The edge pixels must be filled with black dots to fill the original non-existent pixel values. Similarly, when the first image 21 is performed on the pixel shift processing that is used to shift the pixels to the left, the same situation occurs at the right edge of the second image.

Since the left or right pixel offset is determined by the depth information, the effect of generating the second image using the conventional technology may be affected by the depth information of the first depth-information map 22. For example, when the depth information corresponding to the edge pixels on the left and right sides of the first depth-information map 22 are not uniform values, the corresponding pixel offsets 23 are also not uniform values, so that the left edge or the right edge of the second image appears uneven black image blocks. In this way, the stereoscopic image generated by the first image 21 and the second image may affect the viewing experience of the user.

SUMMARY

In view of the problems of the prior art, a stereoscopic image generating method and a stereoscopic image generating device are provided in the present invention to solve the problem that the uneven black image blocks will appear on the left edge or the right edge when the second image is generated in the prior art.

In an exemplary embodiment, a stereoscopic image generating device is provided. The stereoscopic image generating device comprises a storage unit, a display unit and a processing unit, wherein the display unit comprises a display screen, and the processing unit is connected to the storage unit and the display unit. The processing unit obtains a first image from the storage unit. The processing unit processes the first image to obtain depth data of each pixel in the first image and generates a first depth-information map according to the depth data, wherein the first depth-information map comprises depth information corresponding to each pixel. The processing unit uses a plurality of edges of the first depth-information map as a reference and performs uniform processing on the plurality of edge pixels which are within a predetermined width from a plurality of edges of the first depth-information map, so that the processed edge pixels have the same depth information to establish a second depth-information map. The processing unit sets a pixel offset corresponding to each pixel in the first image based on the depth information corresponding to each pixel of the second depth-information map. The processing unit performs pixel offset processing on the first image to generate a second image. The processing unit outputs the first image and the second image to the display unit to display a stereoscopic image.

In some embodiments, the plurality of edges are an upper edge and a lower edge of the first depth-information map.

In some embodiments, the plurality of edges are a left edge and a right edge of the first depth-information map.

In some embodiments, the predetermined width is 1 pixel.

In some embodiments, the depth information corresponding to each of the plurality of edge pixels in the second depth-information map is the maximum depth of field in the first depth-information map.

In some embodiments, the depth information corresponding to each of the plurality of edge pixels in the second depth-information map is the minimum depth of field in the first depth-information map.

In some embodiments, the depth information corresponding to each of the plurality of edge pixels in the second depth-information map is a constant.

In some embodiments, the depth information corresponding to the plurality of edge pixels of the second depth-information map is an arithmetic mean of the depth information corresponding to the plurality of edge pixels of the first depth-information map.

In some embodiments, when the value of the depth information is larger, the corresponding pixel offset is smaller, and when the value of the depth information is smaller, the corresponding pixel offset is larger.

In an exemplary embodiment, a stereoscopic image generating method is provided. The method comprises the following steps: obtaining a first image, processing the first image to obtain depth data of each pixel in the first image, and generating a first depth-information map according to the depth data, wherein the first depth-information map comprises depth information corresponding to each pixel; using a plurality of edges of the first depth-information map as a reference and performing uniform processing on the plurality of edge pixels which are within a predetermined width from a plurality of edges of the first depth-information map, so that the processed edge pixels have the same depth information to establish a second depth-information map;

setting a pixel offset corresponding to each pixel in the first image based on the depth information corresponding to each pixel of the second depth-information map; performing pixel offset processing on the first image to generate a second image; and outputting the first image and the second image to the display unit to display a stereoscopic image.

According to the present invention, since the pixel offset of the first image is set according to the second depth-information map, the second image generated by the present invention may not have uneven black image blocks on the left or right edges.

BRIEF DESCRIPTION OF DRAWINGS

The application can be more fully understood by reading the subsequent detailed description and examples with references made to the accompanying drawings, wherein.

DETAILED DESCRIPTION

The purposes and advantages of the present invention will be more clearly understood by reference to the detailed description described below in conjunction with the accompanying drawings of the invention.

Figure 2A:
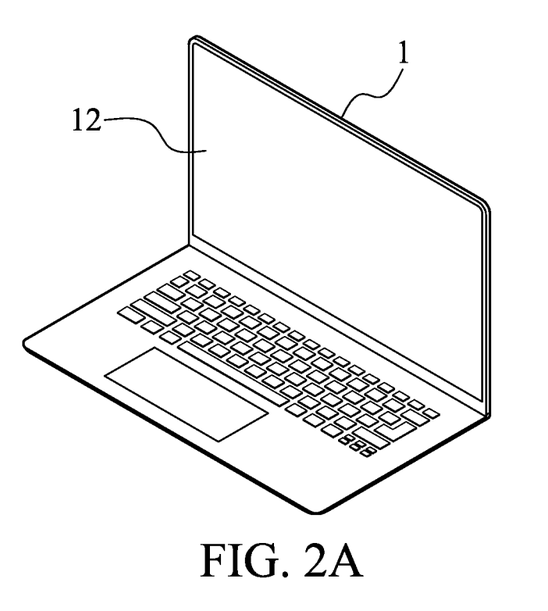
FIG. 2A is a schematic functional block diagram of the stereoscopic image generating device according to an embodiment of the invention.
Figure 2B:
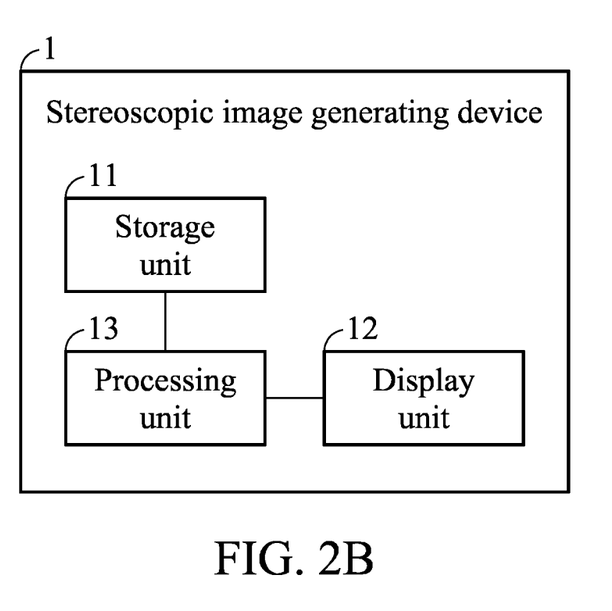
FIG. 2B is a hardware structure diagram of the stereoscopic image generating device according to an embodiment of the invention.

FIG. 2A is a schematic functional block diagram of the stereoscopic image generating device according to an embodiment of the invention, and FIG. 2B is a hardware structure diagram of the stereoscopic image generating device according to an embodiment of the invention.

In FIG. 2A, the stereoscopic image generating device 1 at least comprises: a storage unit 11, a display unit 12, and a processing unit 13. FIG. 2B shows an example in which the stereoscopic image generating device 1 is a notebook computer. However, the notebook computer is only an exemplary example, and the stereoscopic image generating device 1 may also be a desktop computer, a tablet computer, a smart phone, a head-mounted display, a server, a portable electronic device, or other electronic devices with similar computing capabilities.

The storage unit 11 may be, for example, a random access memory (RAM), a read only memory (ROM), a flash memory, an erasable programmable random access memory (EPROM), an electrically erasable programmable random access memory (EEPROM) or other non-volatile memory or volatile semiconductor memory.

In addition, the storage unit 11 may also be a magnetic disk, a floppy disk, an optical disk, a CD, a compact disk, or a Digital Versatile Disc (DVD).

In other words, the storage unit 11 may store any one of the "first image", "second image", "first depth-information map", "second depth-information map", and "pixel offset" mentioned in the invention or a combination thereof, as well as all the parameters, formulas, algorithms, program codes, and so on used when the processing unit 13 performs the processing described below.

The display unit 12 may be, for example, an output device having a display screen, such as a stereoscopic imaging display, a system-integrated panel, a light-emitting diode display, a touch screen, and so on. In other words, the display unit 12 may display any one of the "first image", "second image", "first depth-information map", "second depth-information map", and "pixel offset" mentioned in this specification or a combination thereof on the display screen according to the needs of the user. In some embodiments, the stereoscopic image generating device 1 may not comprise a display unit, and may output the generated stereoscopic image to an external display unit.

The processing unit 13 is connected to the storage unit 11 and the display unit 12, and performs one-way or two-way interaction with the storage unit 11 and the display unit 12. The processing unit 13 uses parameters, formulas, algorithms or program codes stored in the storage unit 11 to perform various processes described below. In addition, the processing unit 13 may be implemented by hardware, software, or a combination thereof.

The processing unit 13 may be composed of a single circuit, a composite circuit, a programmable processor, a parallel programmable processor, a graphics processor, an application specific integrated circuit (ASIC), a field programmable gate array (FPGA), or a combination thereof, to implement the specific functions and processes mentioned in the invention.

In addition, the processing unit 13 may also realize the specific functions and processes mentioned in the invention by reading and executing the program codes stored in the storage unit 11. In other words, the processing unit 13 may be used to implement the "stereoscopic image generating method" mentioned in the invention.

Figure 3:
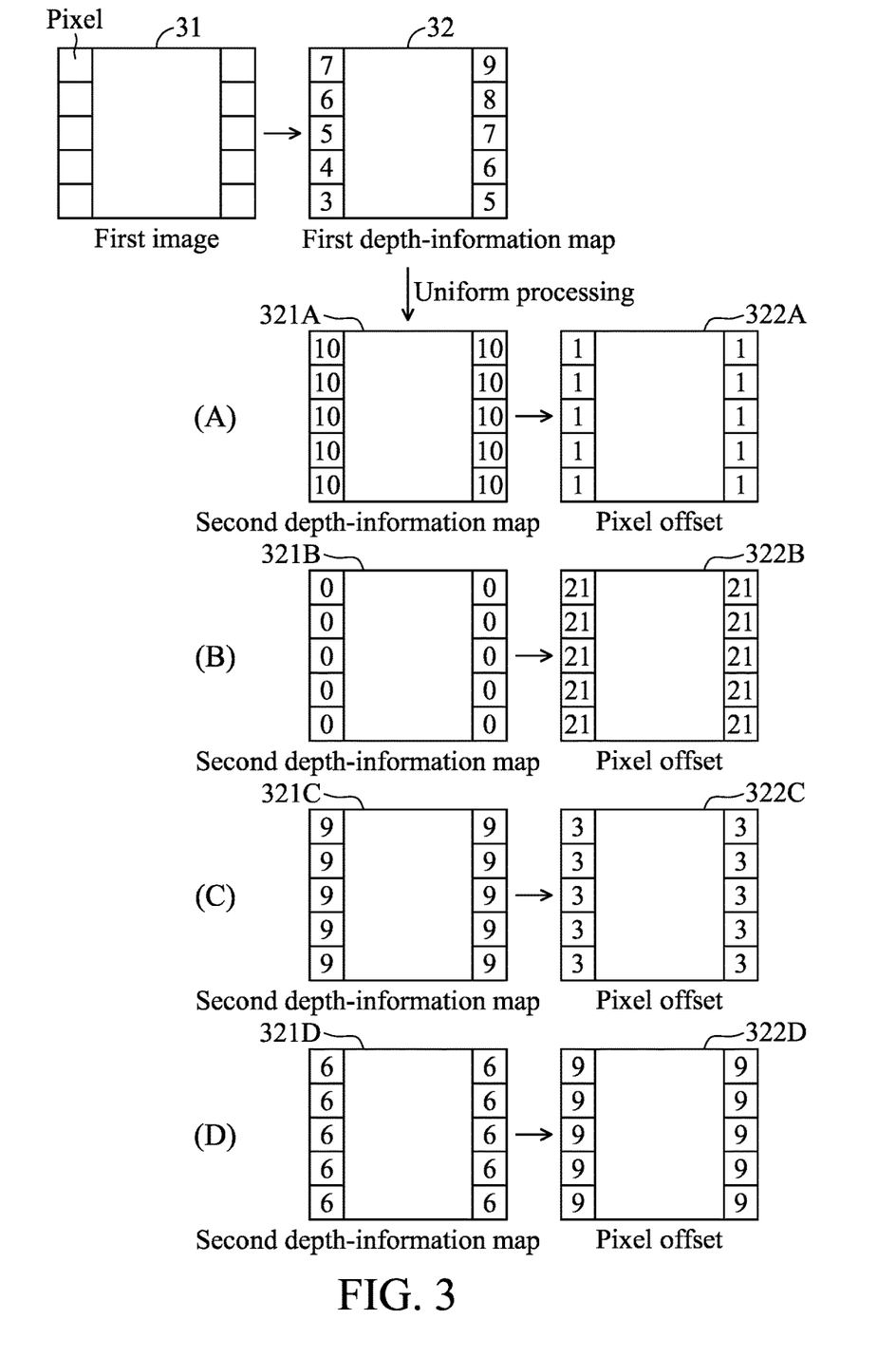
FIG. 3 illustrates one embodiment of the stereoscopic image generating method of the present invention.

FIG. 3 illustrates an operation of the stereoscopic image generating device 1 according to an embodiment of the invention.

As shown in FIG. 3, the processing unit 13 obtains the first image 31 from the storage unit 11. The processing unit 13 obtains the depth data of each pixel in the first image 31 using the depth estimation model, such as (but not limited to) convolutional neural network models or other known depth estimation models, stored in the storage unit 11 to generate the first depth-information map 32. The first image 31 may be the same as or different from the first image 21 shown in FIG. 1. When the first image 31 is the same as the first image 21, the first depth-information map 32 (corresponding to the first image 31) may be the same as or similar to the first depth-information map 22 (corresponding to the first image 21) shown in FIG. 2 after the same depth estimation process. For the sake of simplicity, it is assumed that the first image 31 and the first image 21 are the same, and the first depth-information map 32 and the first depth-information map 22 are also the same.

In addition, for the sake of simplicity, the first image 31, the first depth-information map 32, the second depth-information maps 321A to 321D, and the pixel offsets 322A to 322D in FIG. 3 are exemplified by the image width of 5 pixels. However, in one embodiment, the first image 31 may also be an image with a size of 256×256 pixels, an image with a size of 1920×1080 pixels, an image with a size of 1024×768 pixels, or an image of any other size.

Each pixel of the first depth-information map 32 has corresponding depth information. In the invention, the depth information is a quantifiable value, which is defined as the relative distance between the position of the pixel in 3-dimensional space and the camera. The value of the depth information being larger means that the shooting position of the pixel is farther from the camera. On the contrary, the value of the depth information being smaller means that the shooting position of the pixel is closer to the camera.

Actually, the depth information can be changed in value range for different specifications. For the sake of simplicity, the range of depth information is defined between 0 and 10. 0 represents the minimum depth of field (that is, the closest to the camera) that the first depth-information map 32 may be detected, and 10 represents the maximum depth of field (that is, the farthest to the camera) that the first depth-information map 32 may be detected.

The "depth information" has a certain correspondence with the "pixel offset" described below. Specifically, in the process of generating a stereoscopic image, a smaller pixel offset is set for a pixel with larger depth information; a larger pixel offset is set for a pixel with smaller depth information. The principle of this setting is: when we place an object in front of the eyes and perform lateral translation with the same displacement, the change of the lateral displacement felt by the eyes is smaller while the object is farther away from the eyes; the change of the lateral displacement felt by the eyes is greater while the object is closer to the eyes. Therefore, the characteristic of "negative correlation" between "the depth information and the pixel offset" is used, and the generated stereoscopic image may reflect the real feeling of the human eye when viewing the stereoscopic image. The above description may also explain the correlation between the depth information of each edge pixel in the first depth-information map 22 and the corresponding pixel offset.

In addition, in FIG. 1, the relationship between the depth information and the pixel offset can be expressed by the mathematical formula "pixel offset=21-depth information× 2" (the depth information: 0~10). This mathematical formula may continue to be used in FIG. 3 and FIG. 4, so as to facilitate the reader's understanding of the technical content of the invention, but is not limited to the mathematical formula.

Next, the processing unit 13 processes the depth information of the first depth-information map 32. The processing unit 13 uses a plurality of edges of the first depth-information map 32 as a reference, and performs uniform processing on a plurality of edge pixels within a predetermined width from the plurality of edges, so that the processed edge pixels have the same depth information to establish a second depth-information map.

The plurality of edges mentioned here may be the upper and lower edges of the image, and may also be the left and right edges of the image. The upper edge and the lower edge mean that the pixel offset processing mentioned below is to perform the pixel offset processing of the first image in an upward or downward manner. On the other hand, the left edge and the right edge mean that the pixel offset processing mentioned below is to perform the pixel offset processing of the first image in a left or right manner. Since it is common to perform the pixel offset processing in a left or right manner in the conventional technology, in the following description, a plurality of edge pixels of the left edge and the right edge are used as examples for description.

In addition, from an algorithmic point of view, two-dimensional coordinates may be used to strictly define "edges" called in the invention. Taking an image with a size of 256×256 as an example, when the pixel in the lower left corner of the image is the origin O(0,0), the rightward is the +x direction and the upward is the +y direction, the line segment formed by all pixels whose x-coordinate is 0 and on the side that is not adjacent to other pixels may be defined as the "left edge", the line segment formed by all pixels whose x-coordinate is 255 and on the side that is not adjacent to other pixels may be defined as the "right edge", the line segment formed by all pixels whose y-coordinate is 255 and on the side that is not adjacent to other pixels may be defined as the "upper edge", the line segment formed by all pixels whose y-coordinate is 0 and on the side that is not adjacent to other pixels may be defined as the "lower edge".

In addition, the "predetermined width" from any edge is in units of pixels. For example, when the predetermined width from the left edge and the predetermined width from the right edge are 2, the uniform processing is performed on all edge pixels whose x-coordinates are 0, 1, 254, and 255. When the predetermined width from the left edge and the predetermined width from the right edge are 1, the uniform processing is performed on all edge pixels whose x-coordinates are 0 and 255, and so on.

Figure 4:
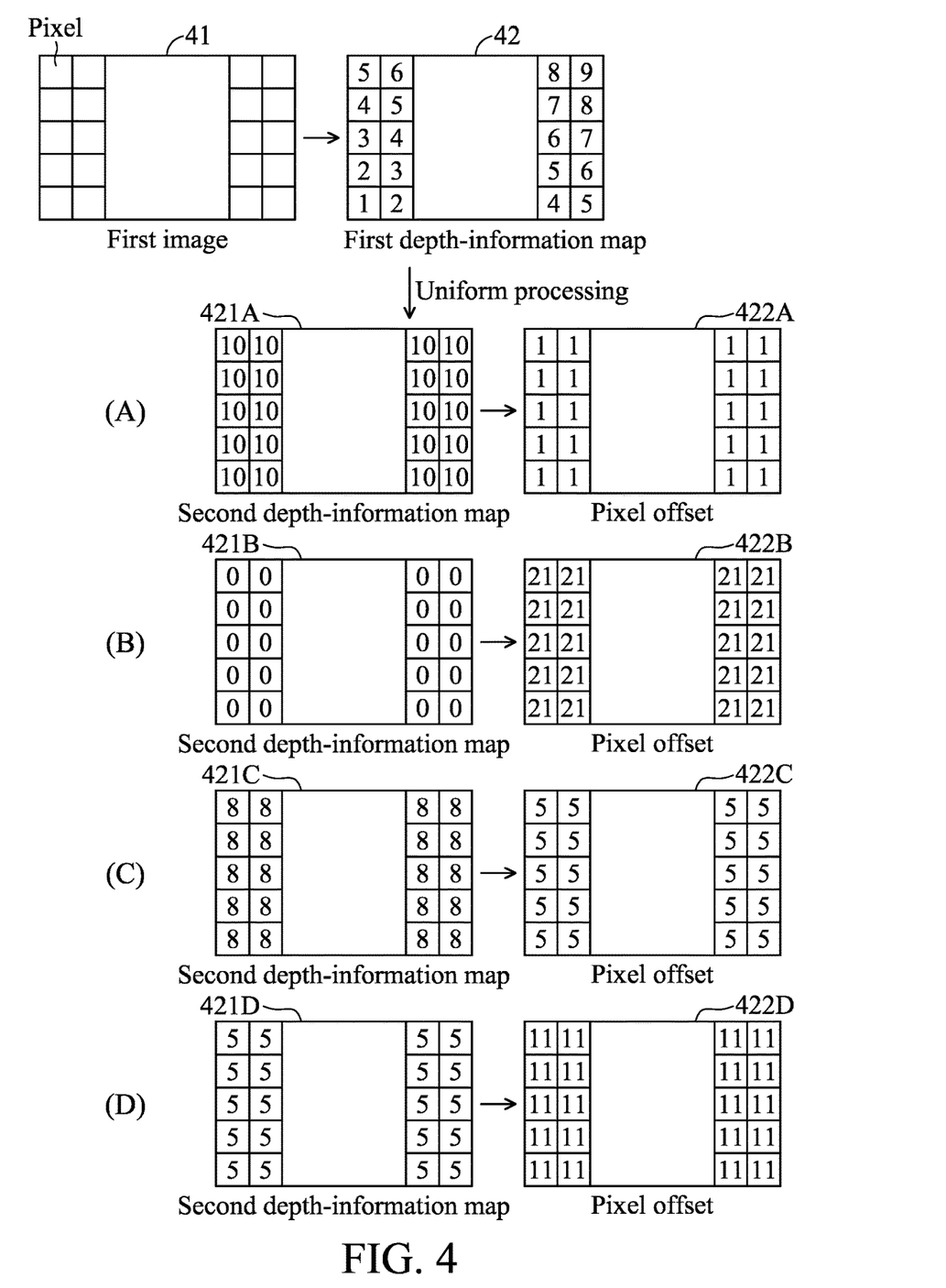
FIG. 4 illustrates one embodiment of the stereoscopic image generating method of the present invention.

In other words, the predetermined width may be any natural number. However, in order to avoid the loss of too much information in the generated stereoscopic image, the predetermined width is generally set to 1 pixel. FIG. 3 shows an embodiment of "the predetermined width=1", and FIG. 4 shows an embodiment of "the predetermined width=2".

The "uniform processing" performed by the processing unit 13 here is to adjust the depth information corresponding to the plurality of edge pixels in the first depth-information map 32 to the same value. In the embodiment shown in FIG. 3, the processing unit 13 may select any one of the four implementations (A) to (D) to adjust the depth information corresponding to the plurality of edge pixels in the first depth-information map 32. In the first depth-information map 32, the depth information corresponding to the pixels other than the plurality of edge pixels remains unchanged without adjustment. In this way, a part of the adjusted depth information and the other part of the unadjusted depth information may be used to establish the four second depth-information maps 321A to 321D described below.

Embodiment (A)

In the embodiment (A) (refer to FIG. 3(A)), the processing unit 13 may set the depth information corresponding to the 10 edge pixels in the first depth-information map 32 as the maximum depth of field (that is, 10) in the first depth-information map 32. Therefore, the depth information corresponding to the 10 edge pixels in the second depth-information map 321A are all 10.

Embodiment (B)

In the embodiment (B) (refer to FIG. 3(B)), the processing unit 13 may set the depth information corresponding to the 10 edge pixels in the first depth-information map 32 as the minimum depth of field (that is, 0) in the first depth-information map 32. Therefore, the depth information corresponding to the 10 edge pixels in the second depth-information map 321B are all 0.

Embodiment (C)

In the embodiment (C) (refer to FIG. 3(C)), the processing unit 13 may set the depth information corresponding to the 10 edge pixels in the first depth-information map 32 as any constant between 0 and 10 (for example, 9) in the first depth-information map 32. Therefore, the depth information corresponding to the 10 edge pixels in the second depth-information map 321C are all 9.

Embodiment (D)

In the embodiment (D) (refer to FIG. 3(D)), the processing unit 13 may calculate an arithmetic mean value for the depth information corresponding to the 10 edge pixels in the first depth-information map 32, and set the 10 edge pixels as the arithmetic mean value. In FIG. 3, since the two groups of edge depth information corresponding to the 10 edge pixels in the first depth-information map 32 are 7, 6, 5, 4, 3 and 9, 8, 7, 6, 5, respectively, the arithmetic mean value is 6. Therefore, the depth information corresponding to the 10 edge pixels in the second depth-information map 321D are all 6.

For the second depth-information maps 321A to 321D generated by the processing unit 13 according to any one of the embodiments (A) to (D), since the depth information corresponding to the 10 edge pixels have been consistent, the pixel offsets corresponding to 10 (2 groups of) edge pixels in the first image 31 can be guaranteed to be the same when the processing unit 13 sets the pixel offsets 322A to 322D corresponding to each pixel in the first image 31 based on the depth information corresponding to each pixel of the second depth-information maps 321A to 321D.

For example, in the embodiment (A), since the depth information corresponding to the 10 edge pixels in the second depth-information map 321A are all 10 (the maximum depth of field), the corresponding pixel offsets 322A are all 1 according to the mathematical formula "pixel offset=21-depth information×2" (the depth information: 0~10).

For example, in the embodiment (B), since the depth information corresponding to the 10 edge pixels in the second depth-information map 321B are all 0 (the minimum depth of field), the corresponding pixel offsets 322B are all 21 according to the mathematical formula "pixel offset=21-depth information×2" (the depth information: 0~10).

For example, in the embodiment (C), since the depth information corresponding to the 10 edge pixels in the second depth-information map 321C are all 9 (any constant between 0 and 10), the corresponding pixel offsets 322C are all 3 according to the mathematical formula "pixel offset=21-depth information×2" (the depth information: 0~10).

For example, in the embodiment (D), since the depth information corresponding to the 10 edge pixels in the second depth-information map 321D are all 6 (the arithmetic mean value), the corresponding pixel offsets 322D are all 9 according to the mathematical formula "pixel offset=21-depth information×2" (the depth information: 0~10).

From the embodiments (A) to (D), in order to simplify the algorithm executed by the processing unit 13 as much as possible and save program resources, it may be considered to directly set the depth information corresponding to the 10 edge pixels to a certain constant (9). In this way, when the processing unit 13 successively processes the continuous frames of the first image 31, the processing unit 13 may ensure that the pixel offsets set successively remain constant and do not fluctuate with time.

In addition, in order to avoid excessive distortion (i.e., the area of the uniform black image block is too large) of the second image generated by performing the pixel offset processing on the first image 31, the processing unit 13 may also directly set the depth information corresponding to the 10 edge pixels as the maximum depth of field (10). In this way, the corresponding pixel offset may be ensured to be the minimum value (1), so that the area of the uniform black image block in the second image is minimized.

Therefore, the processing unit 13 according to the embodiment of the present invention performs the pixel offset processing on the first image 31 to generate a second image not based on the pixel offset (23) corresponding to the first depth-information map 32 (22), but based on the pixel offsets 322A to 322D corresponding to the second depth-information maps 321A to 321D including the plurality of edge pixels that have undergone the uniform processing. In this way, when the processing unit 13 displays the first image 31 and the second image of the stereoscopic image on the display unit 12, there may be no uneven black image blocks appearing at the edges of the stereoscopic image, and the user who is watching can maintain a good quality experience, so it can achieve the desired effect of the invention.

The above description uses FIG. 3 to describe the case where the "predetermined width" is set to 1. FIG. On the other hand, FIG. 4 illustrates the case where the "predetermined width" is set to 2. FIG. 4 illustrates an operation of the stereoscopic image generating device 1 according to another embodiment of the invention.

The difference between this embodiment and FIG. 3 is that the processing unit 13 must process 5 edge pixels with a width of 2 from the left edge and 5 edge pixels with a width of 2 from the right edge in the first depth-information map 42. Therefore, in the uniform processing shown in FIG. 4, there may be depth information corresponding to 20 edge pixels that need to be adjusted.

Embodiment (A)

In the embodiment (A) (refer to FIG. 4(A)), the processing unit 13 may set the depth information corresponding to the 20 edge pixels in the first depth-information map 42 as the maximum depth of field (that is, 10) in the first depth-information map 42. Therefore, the depth information corresponding to the 20 edge pixels in the second depth-information map 421A are all 10.

Embodiment (B)

In the embodiment (B) (refer to FIG. 4(B)), the processing unit 13 may set the depth information corresponding to the 20 edge pixels in the first depth-information map 42 as the minimum depth of field (that is, 0) in the first depth-information map 42. Therefore, the depth information corresponding to the 20 edge pixels in the second depth-information map 421B are all 0.

Embodiment (C)

In the embodiment (C) (refer to FIG. 4(C)), the processing unit 13 may set the depth information corresponding to the 20 edge pixels in the first depth-information map 42 as any constant between 0 and 10 (for example, 8) in the first depth-information map 42. Therefore, the depth information corresponding to the 10 edge pixels in the second depth-information map 421C are all 8.

Embodiment (D)

In the embodiment (D) (refer to FIG. 4(D)), the processing unit 13 may calculate an arithmetic mean value for the depth information corresponding to the 20 edge pixels in the first depth-information map 42, and set the 20 edge pixels as the arithmetic mean value. In FIG. 4, since the four groups of edge depth information corresponding to the 20 edge pixels in the first depth-information map 42 are "5, 4, 3, 2, 1", "6, 5, 4, 3, 2", "8, 7, 6, 5, 4" and "9, 8, 7, 6, 5", respectively, the arithmetic mean value is 5. Therefore, the depth information corresponding to the 20 edge pixels in the second depth-information map 421D are all 5.

For the second depth-information maps 421A to 421D generated by the processing unit 13 according to any one of the embodiments (A) to (D), since the depth information corresponding to the 20 edge pixels have been consistent, the pixel offsets corresponding to 20 (4 groups of) edge pixels in the first image 41 can be guaranteed to be the same when the processing unit 13 sets the pixel offsets 422A to 422D corresponding to each pixel in the first image 41 based on the depth information corresponding to each pixel of the second depth-information maps 421A to 421D.

For example, in the embodiment (A), since the depth information corresponding to the 20 edge pixels in the second depth-information map 421A are all 10 (the maximum depth of field), the corresponding pixel offsets 422A are all 1 according to the mathematical formula "pixel offset=21-depth information×2" (the depth information: 0~10).

For example, in the embodiment (B), since the depth information corresponding to the 20 edge pixels in the second depth-information map 421B are all 0 (the minimum depth of field), the corresponding pixel offsets 422B are all 21 according to the mathematical formula "pixel offset=21-depth information×2" (the depth information: 0~10).

For example, in the embodiment (C), since the depth information corresponding to the 20 edge pixels in the second depth-information map 421C are all 8 (any constant between 0 and 10), the corresponding pixel offsets 422C are all 5 according to the mathematical formula "pixel offset=21-depth information×2" (the depth information: 0~10).

For example, in the embodiment (D), since the depth information corresponding to the 20 edge pixels in the second depth-information map 421D are all 5 (the arithmetic mean value), the corresponding pixel offsets 422D are all 11 according to the mathematical formula "pixel offset=21-depth information×2" (the depth information: 0~10).

Therefore, the processing unit 13 provided in the present invention performs the pixel offset processing on the first image 41 to generate a second image not based on the pixel offset corresponding to the first depth-information map 42, but based on the pixel offsets 422A to 422D corresponding to the second depth-information maps 421A to 421D including the plurality of edge pixels that have undergone the uniform processing. In this way, when the processing unit 13 displays the first image 41 and the second image of the stereoscopic image on the display unit 12, there may be no uneven black image blocks appearing at the edges of the stereoscopic image, and the user who is watching can maintain a good quality experience, so it can achieve the desired effect of the invention.

In addition, the same as the embodiment (the predetermined width is 1) of FIG. 3, in the embodiment (the predetermined width is 2) of FIG. 4, the depth information may also be directly set to a certain constant or set to the maximum depth of field to achieve the additional effect mentioned in the embodiment of FIG. 3.

It should be noted that, in the second depth-information maps 321A-321D and 421A-421D, the pixels other than the plurality of edge pixels also have their corresponding depth information and their respective pixel offsets converted by mathematical formula "pixel offset=21-depth information×2" (the depth information: 0~10). However, as described above, since it is only necessary to make the depth information corresponding to the edge pixels of the second depth-information map consistent, whether the depth information corresponding to the pixels other than the edge pixels of the second depth-information map is consistent or not is not within the scope of consideration in this invention (in other words, it is normal for depth information to be inconsistent. Therefore, the pixels other than the edge pixels are not drawn in FIG. 3 and FIG. 4, and the relevant descriptions are omitted.

In addition, although the negative correlation between the depth information and the pixel offset is expressed by the mathematical formula of "pixel offset=21-depth information×2" (the depth information: 0~10) in the invention, the pixel offset is not necessarily equivalent to the offset by the same amount of pixels. The pixel offset is just a schematic way of conveying the degree of offset by a numerical value. Whether it is a linear or non-linear relationship, the parameters therein may be adjusted with reference to other prior art.

To sum up, no matter whether the processing unit 13 adopts any one of the eight embodiments described in FIG. 3 to FIG. 4, when the processing unit 13 displays the first image and the second image of the stereoscopic image on the display unit 12, the user may not see uneven black image blocks at the edges of the stereoscopic image, and the user may maintain a good viewing experience, so the desired effect of the present invention may be achieved.

The stereoscopic image generating device and the method thereof of the present invention have been described in detail above. While the disclosure has been described by way of example and in terms of the preferred embodiments, it should be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A stereoscopic image generating device, comprising:
a storage unit;
a display unit, comprising a display screen; and
a processing unit, connected to the storage unit and the display unit and obtaining a first image from the storage unit;
wherein the processing unit processes the first image to obtain depth data of each pixel in the first image, and generates a first depth-information map according to the depth data, wherein the first depth-information map comprises depth information corresponding to each pixel;
wherein the processing unit uses a plurality of edges of the first depth-information map as a reference and performs uniform processing on the plurality of edge pixels which are within a predetermined width from a plurality of edges of the first depth-information map to establish a second depth-information map, and depth information corresponding to the processed edge pixels of the second depth-information map are the same as each other;
wherein the processing unit sets a pixel offset corresponding to each pixel in the first image based on the depth information corresponding to each pixel of the second depth-information map;

wherein the processing unit performs pixel offset processing on the first image to generate a second image; and wherein the processing unit outputs the first image and the second image to the display unit to display a stereoscopic image.

2. The stereoscopic image generating device as claimed in claim 1, wherein the plurality of edges are an upper edge and a lower edge of the first depth-information map.

3. The stereoscopic image generating device as claimed in claim 1, wherein the plurality of edges are a left edge and a right edge of the first depth-information map.

4. The stereoscopic image generating device as claimed in claim 1, wherein the predetermined width is 1 pixel.

5. The stereoscopic image generating device as claimed in claim 4, wherein the depth information corresponding to each of the plurality of edge pixels in the second depth-information map is the maximum depth of field in the first depth-information map.

6. The stereoscopic image generating device as claimed in claim 4, wherein the depth information corresponding to each of the plurality of edge pixels in the second depth-information map is the minimum depth of field in the first depth-information map.

7. The stereoscopic image generating device as claimed in claim 4, wherein the depth information corresponding to each of the plurality of edge pixels in the second depth-information map is a constant.

8. The stereoscopic image generating device as claimed in claim 4, wherein the depth information corresponding to the plurality of edge pixels of the second depth-information map is an arithmetic mean of the depth information corresponding to the plurality of edge pixels of the first depth-information map.

9. The stereoscopic image generating device as claimed in claim 1, wherein when the value of the depth information is larger, the corresponding pixel offset is smaller, and when the value of the depth information is smaller, the corresponding pixel offset is larger.

10. A stereoscopic image generating method, comprising:
obtaining a first image, processing the first image to obtain depth data of each pixel in the first image, and generating a first depth-information map according to the depth data, wherein the first depth-information map comprises depth information corresponding to each pixel;
using a plurality of edges of the first depth-information map as a reference and performing uniform processing on the plurality of edge pixels which are within a predetermined width from a plurality of edges of the first depth-information map to establish a second depth-information map, and depth information corresponding to the processed edge pixels of the second depth-information map are the same as each other;
setting a pixel offset corresponding to each pixel in the first image based on the depth information corresponding to each pixel of the second depth-information map;
performing pixel offset processing on the first image to generate a second image; and outputting the first image and second image to a display unit to display a stereoscopic image.

* * * * *